US007604085B2

United States Patent
Osuka et al.

(10) Patent No.: US 7,604,085 B2
(45) Date of Patent: Oct. 20, 2009

(54) ELECTRIC POWER STEERING APPARATUS

(75) Inventors: Akio Osuka, Osaka (JP); Kousuke Yamanaka, Osaka (JP)

(73) Assignee: JTEKT Corporation, Osaka (JP)

( * ) Notice: Subject to any disclaimer, the term of this patent is extended or adjusted under 35 U.S.C. 154(b) by 246 days.

(21) Appl. No.: 10/569,448

(22) PCT Filed: Aug. 27, 2004

(86) PCT No.: PCT/JP2004/012794

§ 371 (c)(1),
(2), (4) Date: Dec. 5, 2006

(87) PCT Pub. No.: WO2005/021356

PCT Pub. Date: Mar. 10, 2005

(65) Prior Publication Data

US 2007/0114093 A1    May 24, 2007

(30) Foreign Application Priority Data

Aug. 29, 2003  (JP)  ............................. 2003-307203

(51) Int. Cl.
*B62D 5/04*  (2006.01)
*F16H 35/00*  (2006.01)
(52) U.S. Cl. ........................ 180/444; 180/428; 180/446; 180/400; 74/388 PS
(58) Field of Classification Search .................. 180/444, 180/428, 446, 400; 74/388 PS
See application file for complete search history.

(56) References Cited

U.S. PATENT DOCUMENTS

| | | | | |
|---|---|---|---|---|
| 5,685,390 | A | * | 11/1997 | Chikuma et al. ............ 180/444 |
| 6,155,376 | A | | 12/2000 | Cheng |
| 6,244,125 | B1 | | 6/2001 | Sano |
| 6,629,578 | B2 | * | 10/2003 | Saruwatari et al. .......... 180/444 |
| 7,021,417 | B2 | * | 4/2006 | Sano et al. .................. 180/444 |
| 7,284,634 | B2 | * | 10/2007 | Tatewaki et al. ............ 180/444 |
| 2002/0096389 | A1 | | 7/2002 | Saruwatari et al. |
| 2002/0148673 | A1 | | 10/2002 | Menjak et al. |
| 2004/0045386 | A1 | | 3/2004 | Saruwatari et al. |
| 2004/0069559 | A1 | | 4/2004 | Iwasa et al. |

(Continued)

FOREIGN PATENT DOCUMENTS

JP              05-262243           10/1993

(Continued)

*Primary Examiner*—Lesley D Morris
*Assistant Examiner*—Marlon A Arce
(74) *Attorney, Agent, or Firm*—Rabin & Berdo, PC

(57) ABSTRACT

An electric power steering apparatus (1, 64) comprises a housing (10) for supporting a steer shaft (9) for axial slide movement, a speed reduction mechanism (23), and a motion converting mechanism (24, 76). The housing (10) includes a plurality of split housings (36, 37; 36, 37A, 70) connected to each other. The speed reduction mechanism (23) includes an output gear (22) surrounding the steer shaft (9). The motion converting mechanism (24, 76) includes a rotary sleeve (28) surrounding the steer shaft (9) and rotatable integrally with the output gear (22) and converts the rotation of the rotary sleeve (28) into axial movement of the steer shaft (9). The rotary sleeve (28) is rotatably supported by first and second bearings (30, 31) disposed on opposite sides of the output gear (22). The split housings (36, 37; 36, 37A, 70) include main split housings (37, 37A) rotatably supporting an input gear (21) and supporting the first and second bearings (30, 31).

10 Claims, 3 Drawing Sheets

U.S. PATENT DOCUMENTS

2004/0168849 A1  9/2004  Honaga et al.

FOREIGN PATENT DOCUMENTS

| | | |
|---|---|---|
| JP | 9-66844 | 3/1997 |
| JP | 2000-46136 | 2/2000 |
| JP | 2000-168585 | 6/2000 |
| JP | 2000-190855 | 7/2000 |
| JP | 2002-211420 | 7/2002 |
| JP | 2002-274397 | 9/2002 |
| JP | 2003-127879 | 5/2003 |
| JP | 2003-127881 | 5/2003 |

* cited by examiner

ELECTRIC POWER STEERING APPARATUS

TECHNICAL FIELD

The present invention relates to an electric power steering apparatus.

BACKGROUND ART

The electric power steering apparatuses include a device of a so-called rack assist type wherein a driving force of an electric motor for steering assist is applied to a steer shaft (rack shaft) via a speed reduction mechanism and a ball screw mechanism thereby axially moving the steer shaft.

The above speed reduction mechanism includes: an input gear connected with an output shaft of the electric motor; and an output gear meshed with the input gear. The above motion converting mechanism includes a ball nut rotated integrally with the output gear, such as to convert the rotation of the output gear into axial movement of the steer shaft.

According to an electric power steering apparatus disclosed in Japanese Unexamined Patent Publication No. 2003-127879 published from Japanese Patent Office on May 8, 2003, for example, a pair of bearings for supporting the ball nut are disposed only on one side of the output gear while the pair of bearings disposed only on one side of the output gear are supported by a common split housing.

However, the ball nut is prone to displacement relative to the housing. In the event of the displacement of the ball nut, there occurs an error in relative positions between the output gear and the input gear. As a result, the input gear and the output gear are in poor meshing engagement, causing noises in the speed reduction mechanism.

According to an electric power steering apparatus disclosed in Japanese Unexamined Patent Publication No. 2002-274397 published from Japanese Patent Office on Sep. 25, 2002, on the other hand, a housing, which supports the steer shaft for axial slide movement, rotatably supports the ball nut via first and second bearings disposed on the opposite sides of the output gear. The above housing includes a first split housing for supporting the first bearing and a second split housing for supporting the second bearing.

Since the first and second bearings are retained by the first and second split housings respectively, the precisions of relative positions between the first and second bearings are affected by assembly precisions of the first split housing and the second split housing.

The error in the relative positions between the first and second bearings causes displacement of the ball nut and the output gear, so that an error occurs in the relative positions between the output gear and the input gear. Accordingly, the input gear and the output gear may be in poor meshing engagement, causing the noises in the speed reduction mechanism.

It is an object of the invention to provide an electric power steering apparatus adapted for positive prevention of the occurrence of noises.

DISCLOSURE OF THE INVENTION

For achieving the above object, a preferred embodiment according to the invention comprises: a housing for supporting a steer shaft for axially slidable movement; a speed reduction mechanism including an input gear driven by an electric motor for steering assist, and an output gear meshed with the input gear and surrounding the steer shaft; a motion converting mechanism including a rotary sleeve surrounding the steer shaft and rotatable integrally with the output gear, and operating to convert the rotation of the rotary sleeve into axial movement of the steer shaft; and first and second bearings for rotatably supporting the rotary sleeve. The housing includes a plurality of split housings connected to each other, whereas the plural split housings include a main split housing for rotatably supporting the input gear. The first and second bearings are disposed on the opposite sides of the output gear and supported by the main split housing.

According to the embodiment, the precisions of relative positions between the first and second bearings may be prevented from being affected by the assembly precisions of the split housings. Hence, the output gear is increased in the positional precision with respect to the housing, so that the input gear and the output gear are notably increased in the meshing engagement precisions. As a result, the speed reduction mechanism may be dramatically decreased in noises.

Furthermore, in a sub-assembly state wherein the input gear and the output gear are assembled in the main split housing, the speed reduction mechanism may be subjected to a verification test to determine whether the noises associated with the meshing engagement are acceptable or not. Therefore, the number of steps involved in noise control may be reduced as compared with the conventional electric power steering apparatus, the whole body of which is assembled before the verification test is conducted on the noises associated with the meshing engagement.

BEST MODES FOR CARRYING OUT THE INVENTION

The best modes for carrying out the invention will be described with reference to the accompanying drawings.

Figure 1:
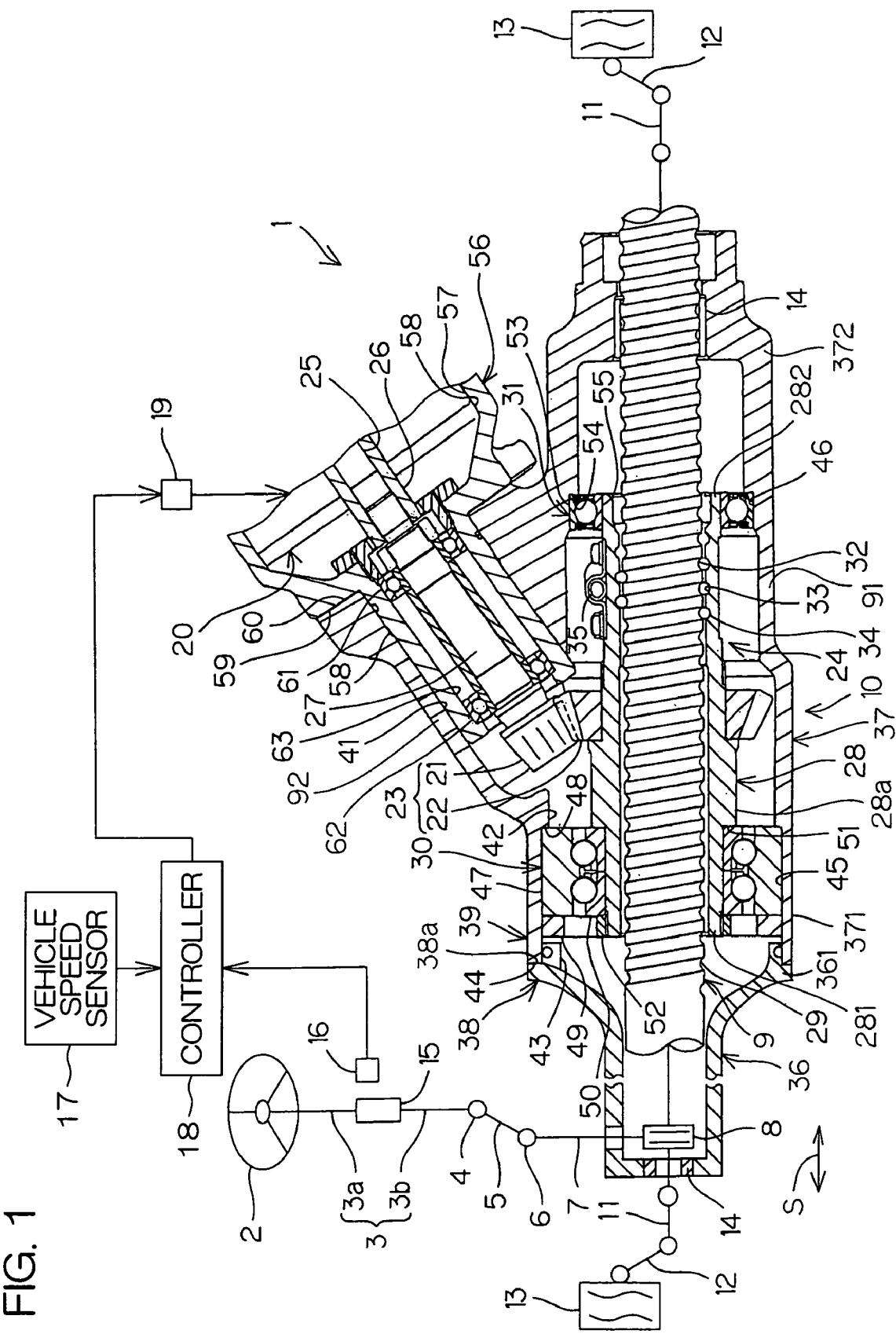
FIG. 1 is a schematic sectional view schematically showing an arrangement of an electric power steering apparatus according to one embodiment of the invention.

FIG. 1 is a schematic sectional view schematically showing an arrangement of an electric power steering apparatus 1 according to one embodiment of the invention. Referring to FIG. 1, the electric power steering apparatus 1 includes: a steering shaft 3 connected to a steering member 2 such as a steering wheel; an intermediate shaft 5 connected to the steering shaft 3 via a universal joint 4; and a pinion shaft 7 connected to the intermediate shaft 5 via a universal joint 6.

The electric power steering apparatus 1 further includes: a steer shaft 9 comprising a rack shaft including rack teeth (not shown) meshed with a pinion 8 mounted to a distal end of the above pinion shaft 7 and extending in transverse directions of a vehicle; and a housing 10 accommodating the steer shaft 9 as allowing for slidable movement thereof in axial directions S.

A tie rod 11 is connected to each of the opposite ends of the steer shaft 9. Each of the tie rods 11 is connected to a corresponding road wheel 13 via a corresponding knuckle arm 12. The steer shaft 9 is supported by the housing 10 via bushings 14 mounted to the opposite ends of the housing 10 respectively. An unillustrated steer shaft supporting device is disposed on the opposite side of the pinion 8 across the steer shaft 9. The steer shaft supporting device operates to press the steer shaft 9 toward the pinion 8 as well as allowing the steer shaft 9 to move in the axial direction, thereby reducing backlash between the rack teeth of the steer shaft 9 and the pinion 8.

When the steering member 2 is operated to rotate the steering shaft 3, the rotation thereof is converted into a linear movement of the steer shaft 9 along the transverse directions of the vehicle by means of the pinion 8 and the rack teeth. Thus it is accomplished the steering of the road wheels 13.

The steering shaft 3 is divided into an input shaft 3a continuous to the steering member 2, and an output shaft 3b continuous to the pinion shaft 7. These input shaft 3a and output shaft 3b are connected with each other along the same axis via a torsion bar 15.

A torque sensor 16 is provided at place for detecting a steering torque based on a quantity of relative rotational displacement between the input shaft 3a and the output shaft 3b via the torsion bar 15. The results of torque detection by the torque sensor 16 and of vehicle speed detection by a vehicle speed sensor 17 are supplied to a controller 18 comprising an electronic control unit (ECU), for example.

Based on the results of detected torque, vehicle speed detection and the like, the controller 18 provides the control of voltage applied to an electric motor 20 for steering assist via a drive circuit 19. An output rotation from the electric motor 20 is converted into axial movement of the steer shaft 9 by means of a speed reduction mechanism 23 including an input gear 21 and an output gear 22, and a motion converting mechanism 24 comprising, for example, a ball screw mechanism. Thus is accomplished the steering assist. The input gear 21 and the output gear 22 comprise, for example, bevel gears meshed with each other.

An output shaft 25 of the electric motor 20 is integrally rotatably connected to a support shaft 27 of the input gear 21 of the speed reduction mechanism 23 via a splined joint 26, for example. The output shaft 25 is connected to one end of the support shaft 27 via the joint 26, whereas the input gear 21 is fixed to the other end of the support shaft 27. The electric motor 20 includes a connection housing 56 to be described hereinlater, thus constituting a motor assembly wherein the input gear 21 is supported by the connection housing 56 via the support shaft 27.

The output gear 22 of the speed reduction mechanism 23 surrounds the steer shaft 9 as integrally rotatably fitted on an outside periphery 28a of a rotary sleeve 28 comprising a ball nut, for example.

The steer shaft 9 is partially formed with a thread shaft 29, the periphery of which is coaxially surrounded by the rotary sleeve 28. The rotary sleeve 28 is supported by the housing 10 via first and second bearings 30, 31 arranged on the opposite sides of the output gear 22, as allowed to rotate but inhibited from moving in the axial directions. The above first bearing 30 comprises, for example, a double-row angular contact ball bearing, whereas the second bearing 31 comprises a ball bearing, for example.

A plurality of rolling elements 34, such as balls, are interposed between a helical thread groove 32 formed in an outside periphery of the thread shaft 29 and a helical thread groove 33 formed in an inside periphery of the rotary sleeve 28. Thus, the rotary sleeve 28 is in thread engagement with the thread shaft 29 via the rolling elements 34. The rolling elements 34 are circulated through the above thread grooves 32, 33 as moved through a tube 35 retained by the rotary sleeve 28. The above arrangement converts the rotation of the rotary sleeve 28 into the movement of the steer shaft 9 along the axial directions S.

The features of the invention are as follows. That is, the housing 10 includes, as plural split housings, an auxiliary split housing 36 and a main split housing 37 which are connected to each other. The auxiliary split housing 36 and the main split housing 37 are arranged along the axial direction S of the steer shaft 9. The main split housing 37 retains both of the first and second bearings 30, 31 thereby accomplishing extremely high precisions of relative positions between the first bearing 30 and the second bearing 31. This results in the prevention of the noises caused by the poor meshing engagement between the input gear 21 and the output gear 22.

The auxiliary split housing 36 accommodates the distal end of the pinion shaft 7, the pinion 8 and a part of the steer shaft 9. The auxiliary split housing 36 is formed with a connection portion 38 at its end 361 adjacent to the main split housing 37.

The main split housing 37 includes: a first sleeve portion 91 for the steer shaft 9 to penetrate therethrough; and a second sleeve portion 92 for accommodating the input gear 21 and the support shaft 27 of the input gear 21, the first and second sleeve portions interconnected crossways. The first and second sleeve portions 91, 92 have their interior spaces communicated with each other.

The main split housing 37 includes: a connection portion 39 for connection with the connection portion 38 of the auxiliary split housing 36; first and second bearing retaining portions 45, 46 for retaining the first and second bearings 30, 31, respectively; an electric-motor retaining portion 41 for retaining the electric motor 20; and a chamber 42 for accommodating the speed reduction mechanism 23 and the motion converting mechanism 24.

The above connection portion 39 and the first and second bearing retaining portions 45, 46 are disposed at the first sleeve portion 91, whereas the electric-motor retaining portion 41 is disposed at the second sleeve portion 92. The above chamber 42 is principally defined in the first sleeve portion 91 and is partially protruded into the second sleeve portion 92.

The connection portion 39 is formed at a first end 371 of the main split housing 37 and has, for example, a cylindrical shape. An annular rim 43 of the connection portion 38 is fitted in an inside circumference of the connection portion 39. Furthermore, an annular step 38a of the connection portion 38 is pressed against an end face 44 of the connection portion 39. The connection portions 38, 39 are fixed to each other by means of an unillustrated bolt or the like.

The first bearing retaining portion 45 is formed on an inside periphery of the first sleeve portion 91 of the main split housing 37 and coaxially surrounds a first end 281 of the rotary sleeve 28. An outer ring 47 of the first bearing 30 is fitted in the first bearing retaining portion 45. The outer ring 47 is clamped by an annular step 48 formed on the inside periphery of the first sleeve portion 91 and a clamp member 49 fixed to the inside periphery of the first sleeve portion 91 with a screw, for example.

Furthermore, an inner ring 50 of the first bearing 30 is fitted on an outside periphery of the first end 281 of the rotary sleeve 28. The inner ring 50 is clamped by an annular step 51 formed on the outside periphery 28a of the rotary sleeve 28 and a clamp member 52 fixed to the outside periphery 28a of the rotary sleeve 28 with a screw, for example.

The second bearing retaining portion 46 is formed on the inside periphery of the first sleeve portion 91 of the main split housing 37 and coaxially surrounds a second end 282 of the rotary sleeve 28. An outer ring 53 of the second bearing 31 is fitted in the second bearing retaining portion 46. The outer ring 53 is pressed against an annular step 54 formed on the inside periphery of the first sleeve portion 91, so as to be inhibited from moving toward a second end 372 of the main split housing. An inner ring 55 of the second bearing 31 is fitted on an outside periphery of the second end 282 of the rotary sleeve 28.

The first bearing retaining portion 45 and the second bearing retaining portion 46 are formed in the main split housing 37 with extremely high precisions with respect to the relative positions therebetween, which include, for example, concentricity relative to each other and axial distance therebetween.

The electric-motor retaining portion 41 is defined by a part of an inside periphery of the second sleeve portion 92 and is designed to retain the electric motor 20 via the connection housing 56.

Specifically, the connection housing 56 is shaped like a cylinder as a whole. A fitting projection 58 of the electric motor 20 is fittingly secured to an annular edge 57 formed on one end of the connection housing 56. The other end of the connection housing 56 is formed with a fitting projection 58 as a retained portion and with an annular step 59 extended radially outwardly from an outside periphery of one end of the fitting projection 58. The fitting projection 58 of the connection housing 56 is fitted in the electric-motor retaining portion 41 of the main split housing 37, whereas the annular step 59 thereof is pressed against an opening edge 60 of the electric-motor retaining portion 41.

The support shaft 27 is rotatably supported by third and fourth bearings 61, 62, which comprise ball bearings, for example. These third and fourth bearings 61, 62 are retained by a bearing retaining portion 63 defined by the inside periphery of the cylindrical connection housing 56.

According to the embodiment as described above, the first and second bearings 30, 31 are both retained by the main split housing 37, whereby the precisions of the relative positions between the first and second bearings 30, 31 are prevented from being affected by the assembly precisions of the main split housing 37 and the auxiliary split housing 36. Since the rotary sleeve 28 and the output gear 22 are increased in the positional precisions with respect to the housing 10, the input gear 21 and the output gear 22 can achieve extremely high precisions of the relative positions therebetween. This results in a good meshing engagement between the input gear 21 and the output gear 22, so that the noises in the speed reduction mechanism 23 may be dramatically decreased.

Figure 2:
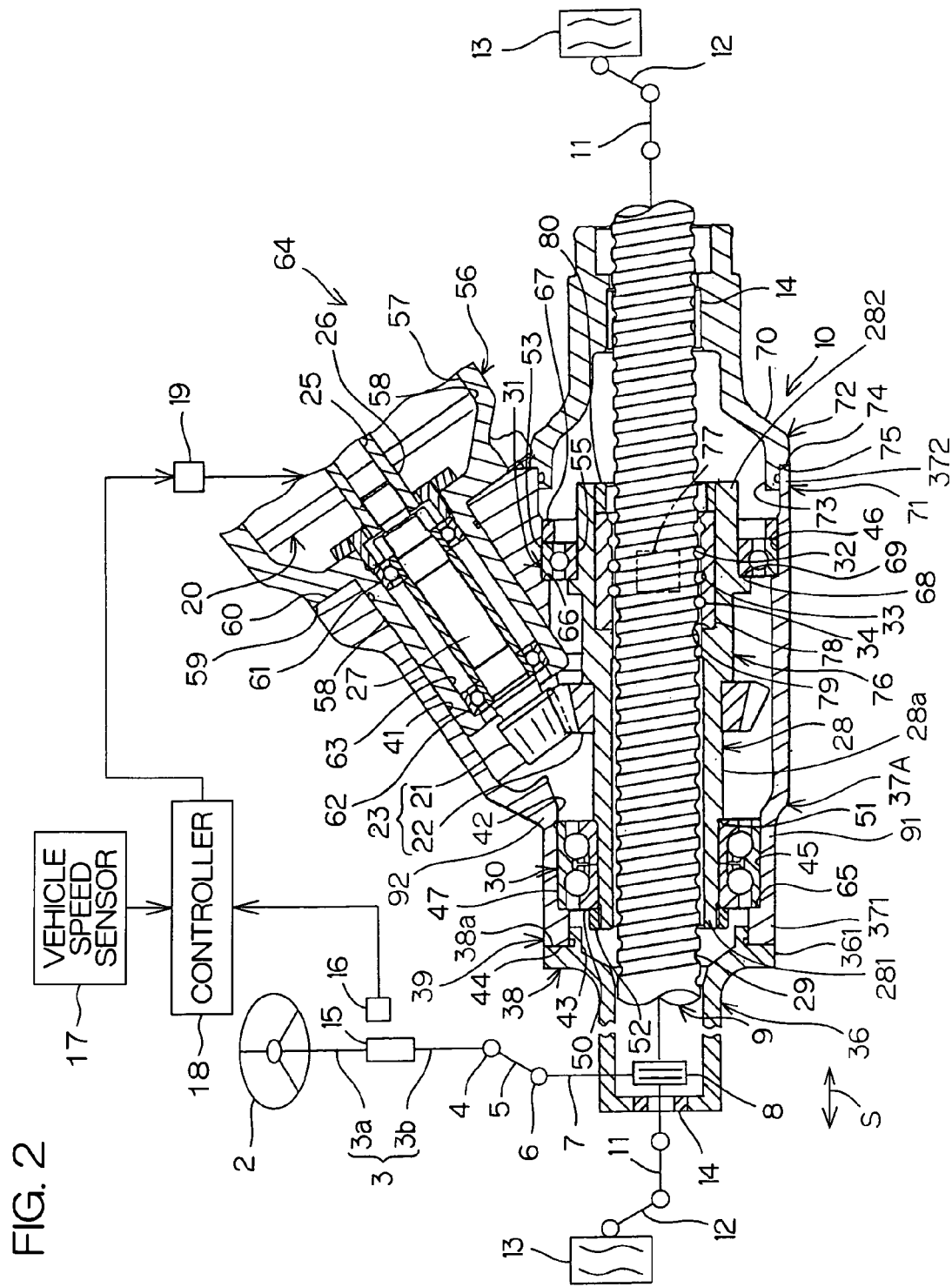
FIG. 2 is a schematic sectional view schematically showing an arrangement of an electric power steering apparatus according to another embodiment of the invention.

FIG. 2 is a schematic sectional view schematically showing an arrangement of an electric power steering apparatus 64 according to another embodiment of the invention. The following description will principally focus on difference from the embodiment shown in FIG. 1. Hence, the same components as the components shown in FIG. 1 will be represented by the same reference characters as those of FIG. 1, respectively and the description thereof will be dispensed with.

Referring to FIG. 2, the features of this embodiment consist in that the housing 10 includes a main split housing 37A and a pair of auxiliary split housings 36, 70 and that the main split housing 37A accommodates the speed reduction mechanism 23 and a motion converting mechanism 76.

The outer ring 47 of the first bearing 30 is fitted in the first bearing retaining portion 45 of the main split housing 37A. The outer ring 47 is pressed against an annular step 65 formed on the inside periphery of the first sleeve portion 91, so as to be inhibited from moving toward the auxiliary split housing 36.

The outer ring 53 of the second bearing 31 is fitted in the second bearing retaining portion 46. The outer ring 53 is clamped by an annular step 66 formed on the inside periphery of the first sleeve portion 91 and a clamp member 67 fixed to the inside periphery of the first sleeve portion 91 with a screw, for example. The inner ring 55 of the second bearing 31 is fitted on the outside periphery of the second end 282 of the rotary sleeve 28. The inner ring 55 has one end face 68 thereof pressed against an annular step 69 formed on the outside periphery of the rotary sleeve 28.

The main split housing 37A includes a pair of connection portions 39, 71 to be connected with the first and second split housings 36, 70, respectively. The connection portion 71 is formed on the second end 372 of the main split housing 37A and has, for example, an annular shape. An annular rim 73 of a connection portion 72 of the auxiliary split housing 70 is fitted in an inside periphery of the connection portion 71, the connection portion 72 formed in the auxiliary split housing 70 at its end adjacent to the main split housing 37A. An annular step 75 of the connection portion 72 is pressed against an end face 74 of the connection portion 71. These connection portions 71, 72 are fixed to each other by means of an unillustrated bolt or the like.

The motion converting mechanism 76 of the embodiment is a ball screw mechanism of a so-called internal circulation type, wherein the rolling elements 34 are circulated through a known ball circulation frame 77 (a part of which is represented by a chain double-dashed line in the figure). The rotary sleeve 28 of the motion converting mechanism 76 is in thread engagement with the thread shaft 29 of the steer shaft 9 via a nut member 78 and the rolling elements 34, the nut member coupled to the rotary sleeve 28 in a manner to be rotatable integrally therewith but inhibited from moving in the axial directions.

The nut member 78 is fitted in an inside periphery of the second end 282 of the rotary sleeve 28 and is clamped by an annular step 79 formed on the inside periphery of the rotary sleeve 28 and a clamp member 80 fittingly secured to the inside periphery of the rotary sleeve 28. The nut member 78 is formed with the thread groove 33 in an inside periphery thereof, whereas the rolling elements 34 are interposed between the thread grooves 32, 33.

The circulation frame 77 is designed to be accommodated in the rotary sleeve 28 as mounted to the nut member 78. The circulation frame 77 interconnects an upstream side and a downstream side of one-turn length of thread groove 33. The circulation frame permits the rolling elements 34 on the downstream side of the thread groove 33 to move over a thread ridge thereof to return to the upstream side, thereby circulating the rolling elements 34 through space between the thread grooves 32, 33.

Figure 3:
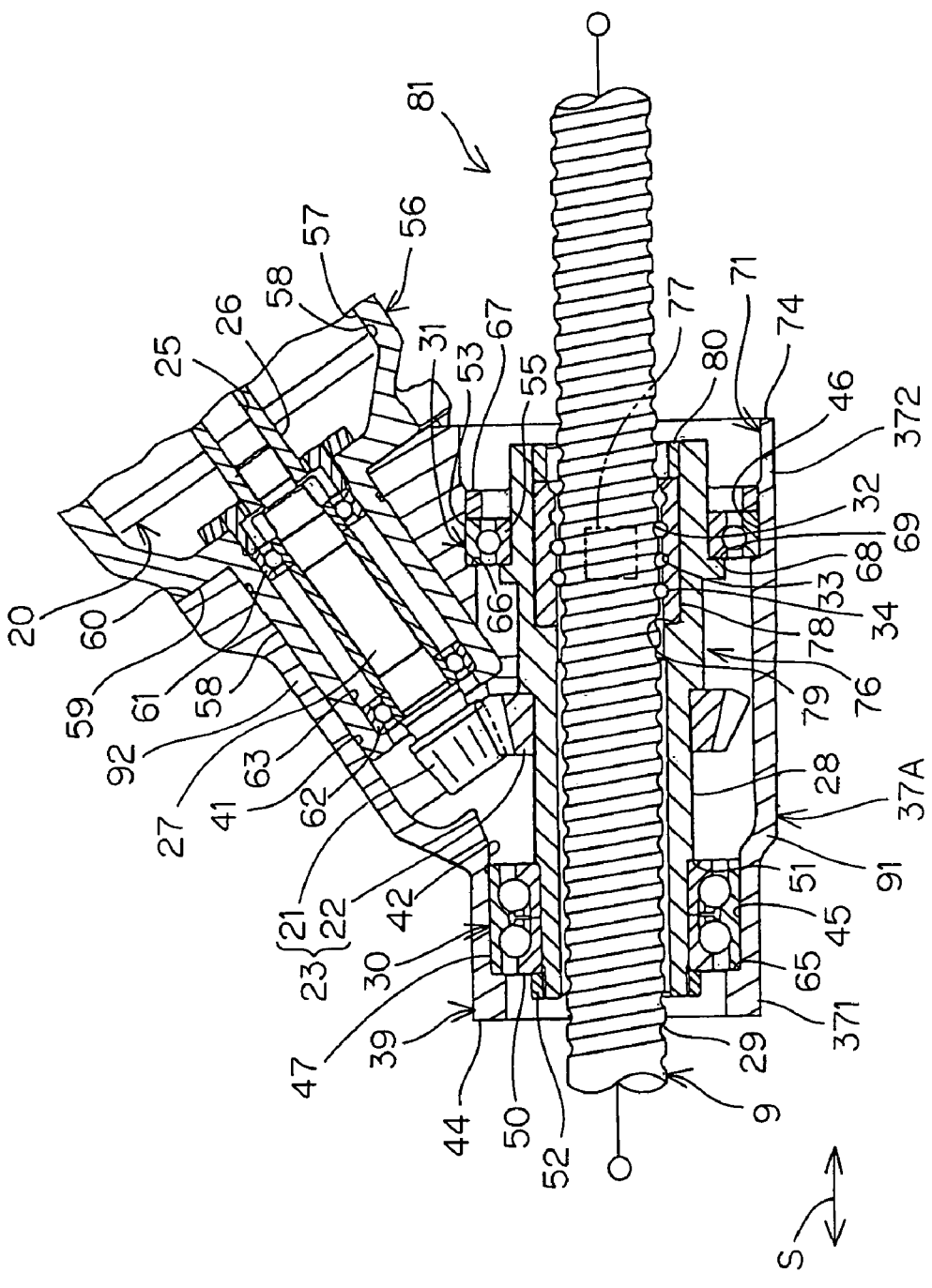
FIG. 3 is a sectional view showing a sub-assembly wherein a speed reduction mechanism and a motion converting mechanism are accommodated in a main split housing.

FIG. 3 is a sectional view showing a sub-assembly wherein the speed reduction mechanism 23 and the motion converting mechanism 76 are accommodated in the main split housing 37A. Referring to FIG. 3, the electric power steering apparatus 64 is assembled as follows. A sub-assembly 81 is previously fabricated by assembling the electric motor 20, the speed reduction mechanism 23 and the motion converting mechanism 76 in the main split housing 37A. The resultant sub-assembly 81 is subjected to tests related to adjustment of the backlash between the input gear 21 and the output gear 22 of the speed reduction mechanism 23 and the noises associated with the meshing engagement between the gears. After completion of the above adjustment and tests, the pair of connection portions 39, 71 of the main split housing 37A are individually connected with the individually corresponding connection portions 38, 72 (see FIG. 2) of the auxiliary split housings 36, 70.

According to the embodiment as described above, the first and second bearings 30, 31 are retained by the common main split housing 37A, whereby the precisions of the relative positions between the first and second bearings 30, 31 are prevented from being affected by the assembly precisions of the split housings 37A, 36, 70. Therefore, the output gear 22 is increased in the positional precision with respect to the housing 10 so that the input gear 21 and the output gear 22 can achieve extremely high precisions of the relative positions therebetween. As a result, the input gear 21 and the output gear 22 may be in good meshing engagement and hence, the speed reduction mechanism 23 may be notably reduced in the noises.

Furthermore, in the state of the sub-assembly 81 wherein the speed reduction mechanism 23 and the motion converting mechanism 76 are assembled in the main split housing 37A, the speed reduction mechanism 23 may be subjected to a verification test to determine whether the noises associated with the meshing engagement are acceptable or not. Therefore, the number of steps involved in the noise control may be notably decreased as compared with the conventional electric power steering apparatus, the whole body of which is assembled before the verification test is conducted on the noises associated with the meshing engagement.

The present invention is not limited to the contents of the foregoing embodiments. In the foregoing embodiments, for instance, a known bearing screw mechanism (such as disclosed in Japanese Unexamined Patent Publication No. 2000-46136 published from Japanese Patent Office on Feb. 18, 2000) may be used as each motion converting mechanism 24, 76 in place of the ball screw mechanism. In this case, each motion converting mechanism 24, 76 may be further reduced in the noises during operation and hence, the electric power steering apparatus may achieve an even more excellent low-noise performance. In addition, a constitution may be made such that the housing 10 includes four or more split housings.

While the invention has been more specifically described with reference to the specific embodiments thereof, changes and modifications thereof and equivalents thereto will be apparent to those skilled in the art who have understood the above contents. The scope of the invention, therefore, is to include the scope of the following claims and the scope of the equivalents thereto.

This application is in correspondence to Patent Application No. 2003-307203 filed with Japanese Patent Office on Aug. 29, 2003, the whole disclosure of which is incorporated herein by reference.

The invention claimed is:

1. An electric power steering apparatus comprising:
a housing for supporting a steering shaft for axially slidable movement, the housing including a plurality of split housings connected to each other, the split housings including a main split housing, and the main split housing rotatably supporting an input gear, and having a first sleeve portion surrounding the steering shaft;
a speed reduction mechanism including the input gear and being driven by an electric motor for steering assist, and an output gear meshed with the input gear and surrounding the steering shaft;
a motion converting mechanism including a rotary sleeve surrounding the steering shaft and rotatable integrally with the output gear, and operating to convert a rotation of the rotary sleeve into axial movement of the steering shaft; and
a first bearing and a second bearing for rotatably supporting the rotary sleeve, disposed on opposite sides of the output gear, and being supported by the main split housing;
the first bearing having a first outer ring fitted in a first retaining portion formed in an inside periphery of the first sleeve portion, an outer diameter of the first bearing being larger than an outer diameter of the output gear; and
the second bearing having a second outer ring fitted in a second retaining portion formed in the inside periphery of the first sleeve portion.

2. An electric power steering apparatus according to claim 1, further comprising:
a support shaft for integrally rotatably supporting the input gear; and
a third bearing supported by the main split housing and rotatably supporting the input gear via the support shaft.

3. An electric power steering apparatus according to claim 1, wherein the split housings are arranged along an axial direction of the steering shaft.

4. An electric power steering apparatus according to claim 1,
wherein the main split housing includes a pair of ends, and
wherein the split housings include an auxiliary split housing connected to at least one of the ends of the main split housing.

5. An electric power steering apparatus according to claim 1,
wherein the main split housing includes a pair of ends, and
wherein the split housings include a pair of auxiliary split housings individually connected to each of the pair of ends of the main split housing.

6. An electric power steering apparatus according to claim 5,
wherein the main split housing includes a pair of connection portions to be individually connected to each of the pair of auxiliary split housings,
wherein the main split housing includes an electric-motor retaining portion for retaining the electric motor, and
wherein the main split housing accommodates the speed reduction mechanism and the motion converting mechanism.

7. An electric power steering apparatus according to claim 1, wherein the main split housing includes an electric-motor retaining portion for retaining the electric motor.

8. An electric power steering apparatus according to claim 7,
further comprising a support shaft for integrally rotatably supporting the input gear,
wherein the main split housing includes a first sleeve portion surrounding the steering shaft, and a second sleeve portion extended in a crosswise direction to the first sleeve portion, the second sleeve portion formed with the electric-motor retaining portion in an inside periphery thereof,
wherein the electric motor includes a connection housing fitted in the electric-motor retaining portion, and
wherein the connection housing rotatably supports the input gear via the support shaft.

9. An electric power steering apparatus according to claim 1, wherein the main split housing accommodates the speed reduction mechanism and the motion converting mechanism.

10. An electric power steering apparatus according to claim 1,
wherein the motion converting mechanism includes a ball screw mechanism, and
wherein the ball screw mechanism includes: a ball nut as the rotary sleeve, a thread shaft formed on a part of the steering shaft, and balls in engagement with the ball nut and the thread shaft.

* * * * *